J. W. DRUMMOND.
DEMOUNTABLE RIM.
APPLICATION FILED DEC. 22, 1915.
1,222,542.
Patented Apr. 10, 1917.
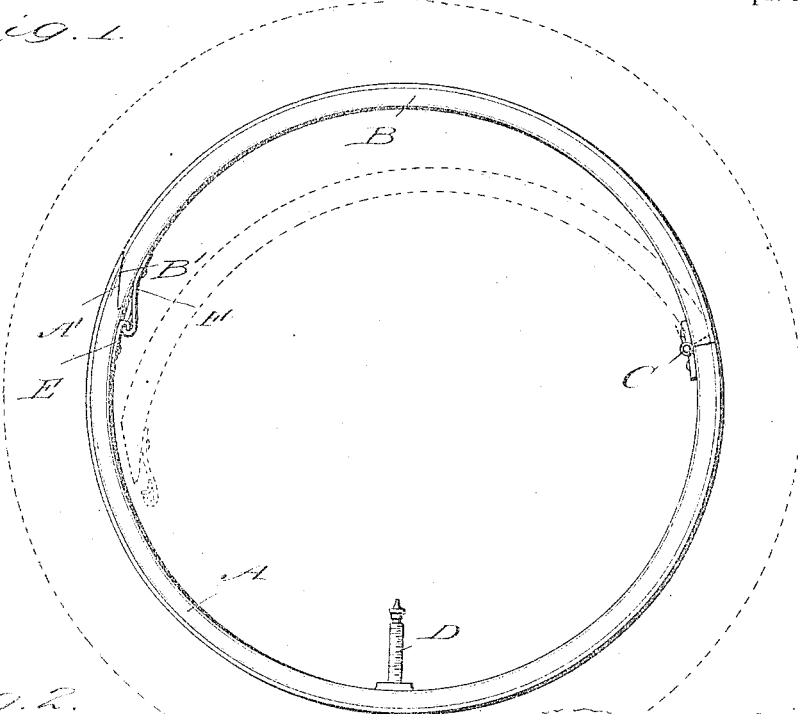
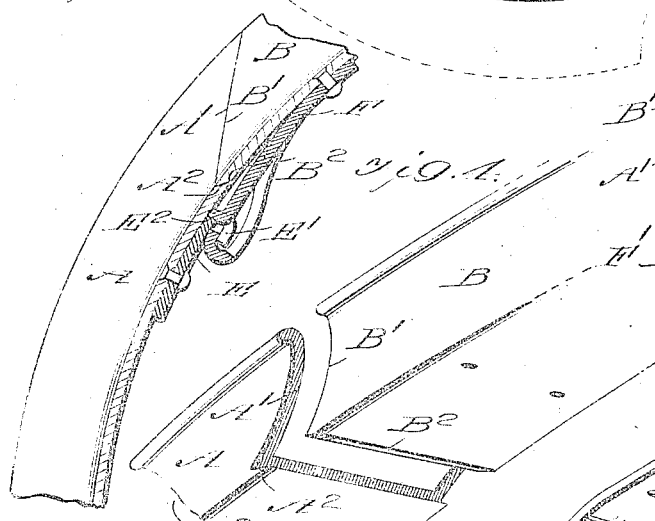
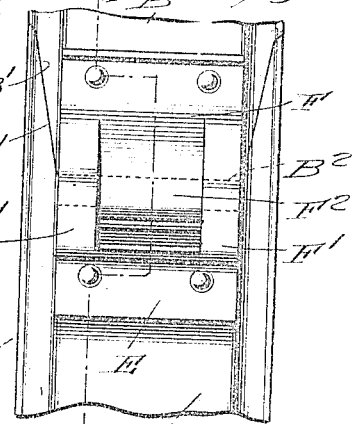
WITNESSES:
INVENTOR
Joseph W. Drummond
BY
ATTORNEYS

UNITED STATES PATENT OFFICE.

JOSEPH W. DRUMMOND, OF CHILLICOTHE, OHIO.

DEMOUNTABLE RIM.

1,222,542.  Specification of Letters Patent.  Patented Apr. 10, 1917.

Application filed December 22, 1915. Serial No. 68,137.

*To all whom it may concern:*

Be it known that I, JOSEPH W. DRUMMOND, a citizen of the United States, and a resident of Chillicothe, in the county of Ross and State of Ohio, have invented a certain new and useful Improvement in Demountable Rims, of which the following is a specification.

My present invention relates generally to demountable rims, and more particularly to demountable rims of that nature including hinged sections, my primary object being to provide a rim which may be readily associated with, and disassociated from, a tire, embodying hinge sections, the free ends of which are so formed as to lock and unlock substantially in an automatic manner, and to defeat all danger of accidental displacement when tire inflated pressure is applied thereto.

A further object of my present invention is to provide, for use in connection with the rim as above, means at the separable joint between the sections for maintaining the latter against displacement should the tire become deflated, and to obviate all danger of relative movement of the sections either laterally or away from one another.

In the accompanying drawing illustrating my invention, and which forms a part of this specification:

Figure 1 is a side elevation showing my improved rim complete.

Fig. 2 is a longitudinal section through the separable joint between the hinge sections enlarged, taken substantially on line 2—2 of Fig. 3.

Fig. 3 is a face view looking at the inner periphery of that portion of the rim shown in Fig. 2.

Fig. 4 is a detail perspective view of the separable ends of the sections together with the interlocking tongues, the several parts being in detached relation.

Referring now to these figures, the rim to which my present improvements are applied, consists of two sections A and B, the section A being of greater length than the section B, and the said sections being connected together at a certain point by a hinge C, leaving their free ends relatively adjustable to provide for ready association with and disassociation from a tire in connection with which the rim is to be utilized, the hinge C being preferably located at such a point that the opening of section A for the reception of the valve tube D of a tire will be diametrically opposite the center of the section B, providing for manipulation of the latter without danger of contact with the said valve tube. This relative disposition of the parts, which I prefer, is well illustrated in Fig. 1, although it is to be appreciated that it may in some instances be varied where other conditions, more important than those stated, are to be observed.

As clearly seen in the several figures, the meeting free ends of the sections A and B are beveled as at A' and B' in order that the free end of section B may freely swing inwardly when disengaged, it being further noted, as best seen in Figs. 1, 2, and 4, however, that these free ends of the sections are provided with relatively engaging shouldered portions forming a substantial lock when tire inflated pressure is applied to the rim.

To this end the free end of section A has an undercut shoulder $A^2$ adjacent its inner periphery, forming a recess for the reception of the shoulder $B^2$ at the free end of section B, the structure thus described being such as to provide the meeting ends of the sections A and B with substantially V-shaped interlocking portions constituting part of their beveled meeting ends whereby tire inflated pressure upon the rim effectively holds the shouldered portions in engagement and prevents relative movement of the section B with respect to the section A.

To engage the sections in practice, an uninflated tire is placed around the rim with the section B disengaged and in the position shown in dotted lines in Fig. 1, and when so placed section B is kicked outwardly to proper position, the tire being uninflated, permitting the necessary sl.ght expansive movement of the entire rim to engage the sections as shown in Fig. 2.

When removing the tire from the rim, the former is deflated and the free end of section A is kicked outwardly, the beveled faces of the shouldered ends riding upon one another and freeing the section B for inward swinging movement.

My invention also contemplates the utilization of means whereby to prevent all danger of lateral shifting of the locked ends of the sections A and B and all tendency of the same to pull apart in use, and to this end contemplates the provision of a pair of interlocking tongues E and F consisting of plates riveted to the inner peripheral faces of the said sections.

These tongues E and F are provided with oppositely presented spaced hook extremities E' and F' which come into engagement in the position best seen in Fig. 2, when the sections A and B of the rim are in operative positions, thus defeating any tendency of the sections to pull away from one another in use. The tongue E furthermore has a shoulder $E^2$ extending between its hook extremities E' and the tongue F is provided with a spring catch member $F^2$, extending between its hook extremities F' and adapted for engagement behind the shoulder $E^2$ as seen in Fig. 2, when the hook extremities E' and F' are engaged to the extent shown.

Thus it will be seen that through the use of the tongues E and F in connection with the particular joint at the meeting ends of the sections A and B, a substantially rigid connection is formed which prevents the interlocked ends of the sections A and B from pulling away from one another and from lateral displacement. When the tongues E and F are utilized in connection with the joint, it is of course necessary to unlock or raise the spring catch $F^2$ by the application of a screw driver or like implement, before the section B can be released from the section A.

I claim:—

1. A rim formed of hinged sections having beveled meeting free ends provided with V-shaped interlocking portions constituting part of said beveled meeting ends and automatic clamping means, including members carried by said rim ends and relatively engageable when said interlocking rim portions are engaged, and a spring latch for locking said members in engaged position.

2. A rim formed of hinged sections having beveled free ends provided with relatively engaging shouldered portions, and automatic clamping means for preventing relative movement of said free ends in any direction and maintaining said shouldered portions in engaged relation, said clamping means consisting of oppositely bent hook members mounted upon the inner peripheries of the said rim sections adjacent the said beveled free ends and being movable to operative position when said shouldered portions are engaged.

3. A rim formed of hinged sections having their free ends beveled and provided with relatively engaging shouldered portions, automatically interlocking hooks carried by said sections adjacent their free ends whereby to prevent the sections from pulling apart and a spring latch for automatically securing said hooks in engaged position.

4. A vehicle wheel rim comprising sections having hinged connections with one another and having beveled free meeting extremities, tongues adjacent to the free extremities of the rim sections having interlocking oppositely bent hooks, and a latch member for automatically locking said hooks against displacement carried by one of said tongues.

5. A vehicle wheel rim comprising sections having a hinged connection with each other and having beveled free meeting extremities, tongues adjacent to the free extremities of the rim sections having interlocking hooks, and a spring catch on one of said tongues adapted to engage the other tongue for the purpose of retaining the hooks of the tongues in interlocked relation.

6. A vehicle wheel rim comprising sections having a hinged connection with each other and having beveled free meeting extremities, tongues adjacent to the free extremities of the rim sections having interlocking hooks, and a spring catch on one of said tongues adapted to engage the other tongue for the purpose of retaining the hooks of the tongues in interlocked relation, said spring catch also serving to prevent relative lateral movement of the free extremities of the rim sections.

JOSEPH W. DRUMMOND.